H. J. DAVIES.
COMBINED CLOCK AND MIRROR.
No. 188,864.　　　　　　　　Patented March 27, 1877.
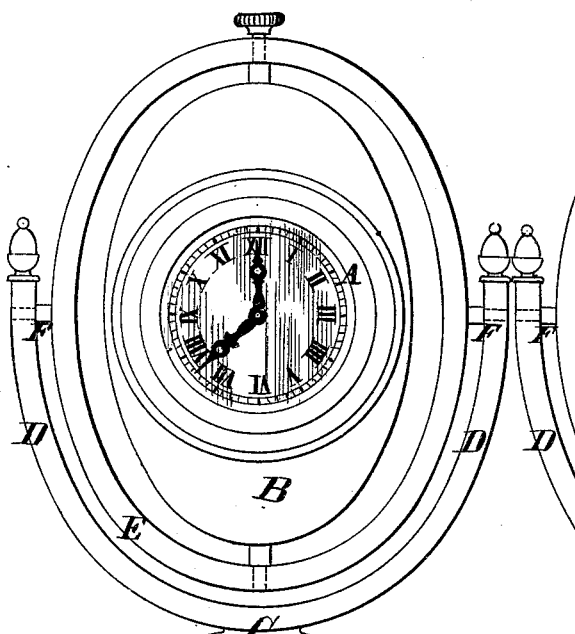
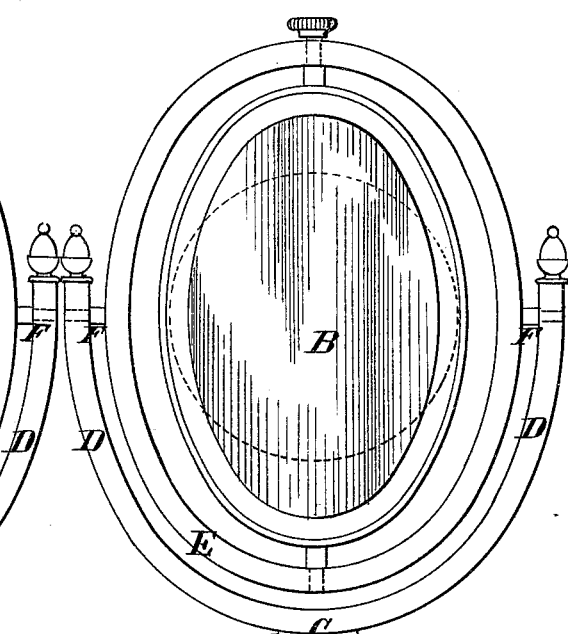

UNITED STATES PATENT OFFICE.

HENRY J. DAVIES, OF NEW YORK, N. Y.

IMPROVEMENT IN COMBINED CLOCK AND MIRROR.

Specification forming part of Letters Patent No. 188,864, dated March 27, 1877; application filed January 17, 1877.

*To all whom it may concern:*

Be it known that I, HENRY J. DAVIES, of the city, county, and State of New York, have invented an Improvement in Clock and Mirror Supports; and I do hereby declare that the following is a full, clear, and exact description of the same, reference being had to the accompanying drawing, forming part of this specification.

The invention consists in a clock and mirror connected back to back, in combination with a support or frame, to which said connected clock and mirror are pivoted in such manner that they can be reversed at pleasure, to enable either the clock or the mirror to be brought to the front for use, without turning the said support on its base or pedestal.

Figure 1 in the accompanying drawing represents the said connected clock and mirror, and their support, with the clock brought into the front position. Fig. 2 represents the same with the position of the connected clock and mirror, as shown in Fig. 1, reversed, to bring the mirror into the front position.

A is the clock, and B the mirror attached to the back of said clock. C is the stand, having a tripod base or a pedestal of any kind, and uprights D. Said uprights D support a ring, E, either pivoted at F to said uprights or rigidly attached thereto, and forming a continuation of said uprights.

The clock A and mirror B, connected back to back, as aforesaid, are either pivoted to the said ring E, or rigidly attached thereto; but when the said connected clock and mirror are rigidly attached to the ring E, the said ring must be pivoted to the supports D; or, when the said ring E is rigidly attached to the said supports D, the connected clock and mirror must be pivoted to the said ring. In general, however, I prefer to both pivot the ring E to the supports D, and pivot the connected clock and mirror to the said ring.

This construction renders the connection of the clock and mirror extremely compact and convenient for small dressing-tables and work-tables, and other positions where compactness is desirable.

I claim—

The clock and mirror connected back to back, in combination with a frame or support, in which such clock and mirror are so pivoted as to be reversible, substantially as described.

HENRY J. DAVIES.

Witnesses:
 FRED. HAYNES,
 EDWARD B. SPERRY.